March 27, 1928.
H. A. DAUM
1,664,354
KEY MILLING MACHINE
Filed May 19, 1923
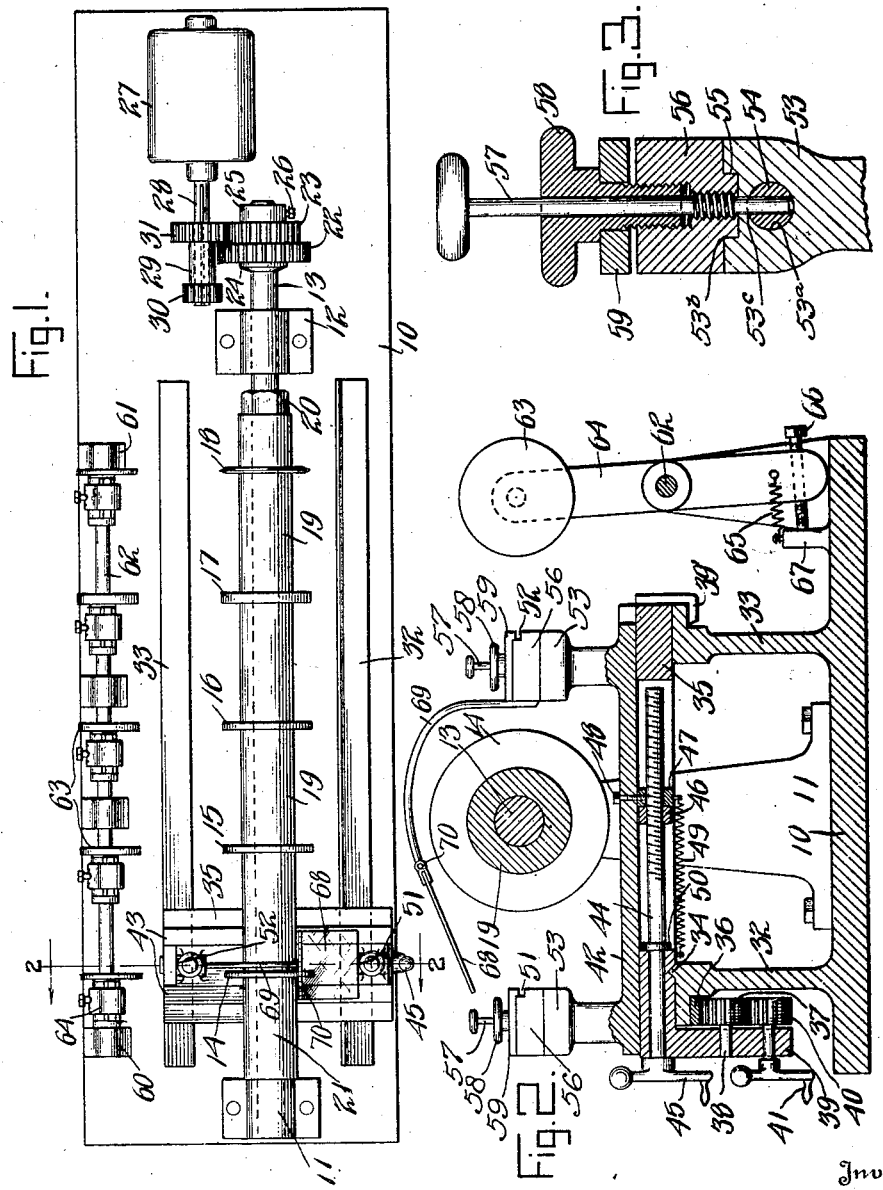
Inventor
Herbert A Daum
By
Attorney Patented Mar. 27, 1928.

1,664,354

UNITED STATES PATENT OFFICE.

HERBERT A. DAUM, OF INDIANAPOLIS, INDIANA.

KEY-MILLING MACHINE.

Application filed May 19, 1923. Serial No. 640,207.

My said invention relates to key milling machines and it is an object of the invention to provide a machine of this character in which keys of all kinds may be made, for example keys either of the Yale type or of other common and well-known types can be prepared from blanks and this can be done in a ready and expeditious manner without any considerable delay, as in the operation of other key milling machines, for resetting the machine, for applying different cutters thereto, etc.

A further object of the invention is to provide an improved work-holder having means for supporting a pattern, and means for supporting the blank which is to be wrought into the same shape as the pattern.

Referring to the accompanying drawings which are made a part hereof and on which similar reference characters indicate similar parts, Figure 1 is a plan of my improved machine, Figure 2, a section on line 2—2 of Figure 1, and Figure 3 a section through one of the gripping devices on the workholder.

In the drawings reference character 10 indicates the fixed base of the machine. This base supports a pair of bearings 11 and 12 in which is mounted a rotary shaft 13 having mounted at intervals along its length a number of milling cutters 14, 15, 16, 17 and 18. These cutters differ from each other in various respects, as for example certain cutters are wider than others and the end cutter 18 is V-shaped at its periphery for cutting V-grooves in Yale keys. The cutters are spaced by collars or sleeves 19 fitting about the shaft and a nut 20 threaded on one end of the shaft forces the remaining parts against a fixed collar or sleeve 21 at the other end of the shaft, which if preferred may be formed as a shoulder integral with the shaft. Beyond the bearing 12 shaft 13 is provided with a pair of change speed gears 22 and 23 held in place against a shoulder 24 by collar 25 secured to the shaft by a set screw 26.

A motor 27 is supported in bearings carried by the base 10 and drives a shaft 28 on which is a slidable sleeve 29 having at one end a pinion 30 adapted to mesh with gear 22 and at the other end a pinion 31 adapted to mesh with the gear 23 to change the speed of the machine in an obvious manner. A pair of bars 32 and 33 rise from the base, both of the bars being flat at the top and one of them being provided with a longitudinal ridge 34 for guiding a work support 35 adapted to move lengthwise of the base on said bars. Underneath a forwardly projecting ledge of the bar 32 is a rack 36 engaged by a pinion 37 on a stub shaft 38 carried by a depending flange 39 of the work support 35.

The flange 39 and parts carried thereby serve to hold the work support down on the bar or track iron 32, while a depending hook-shaped flange 39' at the back of the work support engages under a horizontal flange of bar 33 to hold down the work support at the rear side.

A pinion 40 has teeth engaging those of the pinion 37 and a hand crank 41 is fixed to the forward end of the shaft which carries pinion 40. By turning the hand crank 41 the work support may be moved along the bars in an obvious manner. A transversely movable table 42 is supported between guides 43 on the work support 35. For moving the table 42 I have provided a shaft 44 mounted in a bearing on the work support and having at its forward end a hand crank 45. At its other end the shaft has threads for engagement with the threads of a nut 46. This nut bears against a lug 47 secured to the table 42 as by a screw 48 or if preferred the collar may be integral with the table. A spring 49 is fast at one end to a projection on the collar 47 and at the other end to a projection on the work support whereby the spring tends to draw the table 42 toward the front of the machine. A fixed collar at 50 on the shaft 44 limits its movement to the left.

The table 42 carries a pair of chucks 51, 52 at its front and rear ends respectively. Each of said chucks comprises an integral upward extension 53 on the table having a cylindrical opening $53^a$ extending centrally through the upper end in a direction from front to rear of the machine and an upper groove $53^b$ parallel thereto. The cylindrical opening $53^a$ and the groove $53^b$ are connected throughout their length by a longitudinal slot $53^c$. The lower chuck member 56 has a downwardly extending tongue 55 adapted for sliding engagement with the groove $53^b$ and has a central vertical threaded opening to receive screw 57 which screw extends at its lower end into a cylindrical plug, 54, longitudinally slidable in the cylindrical opening 53ª said screw being headed over at the bottom to prevent withdrawal from the plug thus providing a swivel joint. The lower central opeing in the chuck member 56 communicates with an enlarged concentric opening above it arranged to receive the lower threaded end of a screw 58 adapted to force the upper chuck member 59 down toward the member 56 and thus clamp a key or a blank in position between the jaws of the chuck members.

For convenience in assembling the parts, the cylindrical opening 53ª receiving the plug 54, communicates at the top with the slot extending parallel to the opening. The parts 58, 59 and 56 are assembled on the screw 57 as indicated, then the plug 54 is positioned on the screw and the lower end is headed to retain the plug in place and to provide a swivel joint after which the plug is pushed endwise into the opening 53ª, the part of the screw just above the plug passing through the slot 53ᶜ just referred to and the lower extension or tongue 55 on chuck member 56 sliding in the slot 53ᵇ or above the same. After this the screw 57 is turned to cause the lower chuck member 56 to seat on its support 53 with the tongue 55 in groove 53ᵇ and the screw 58 is turned to bring the chuck jaws together. At the rear of the base a pair of upstanding bearings are provided at 60 and 61 for a pivot shaft 62 on which are supported a number of guide disks 63, each guide disk being rotatably supported at the upper end of a lever 64. Springs 65 tend to move the levers and their guide disks in one direction and such movement is limited by set-screws 66 bearing against abutments 67 on the base of the machine.

In the operation of my device a blank is mounted in the chuck 51 and a pattern in the chuck 52 according to the desired conformation of the key to be made. The work support is not moved along the track irons until the key is properly positioned relative to the desired cutter. The key is now forced against the cutter by turning the crank 45 to move the table 42 rearwardly and this movement is continued until a corresponding portion of the pattern strikes the appropriate guide disk 63 to stop such movement, it being understood that the guide disk has been properly set prior to the cutting operation by means of its set screw 66. I have provided the spring 49 so that the operator, if he prefers, may force the table back by hand against the tension of the spring. This is more expeditious and is probably preferable for skilled operators. After having made one cut the work support will be moved on to the next appropriate cutter usually in the same direction of movement in all cases and the appropriate cuts will be made by the different cutters, the disk 63 being set in each case according to the desired depth of cut.

It will be obvious to those skilled in the art that my device may be modified in various respects and therefore I do not limit myself to the specific structure shown in the drawings and described in the specification but only as indicated in the appended claims.

I have indicated at 68 a guard of transparent material such as glass which serves to protect the face and eyes of the operator against metal cuttings and dust without interfering with his observation of the work being done. The guard is supported by a bracket 69 in the form of a bent rod to which it is hinged at 70, the hinge connection permitting the guard to be turned back out of the way while the work is being placed in the chuck or removed therefrom.

Having thus fully described my said invention, what I claim as new and desire to secure by Letters Patent, is:

1. A key milling machine embodying a shaft, a plurality of spaced cutters on the shaft, sleeves interposed between the cutters on said shaft for spacing the cutters apart, a work support movable longitudinally with reference to the shaft, a chuck on the work support movable transversely of the shaft, means whereby the chuck may be moved positively toward the shaft, and means for moving it yieldably away from the shaft, substantially as set forth.

2. A key milling machine embodying a shaft, a plurality of spaced cutters on the shaft, sleeves interposed between the cutters on said shaft for spacing the cutters apart a work support movable longitudinally with reference to the shaft, a chuck on the work support movable transversely of the shaft, and means for moving it yieldably away from the shaft, substantially as set forth.

3. A key milling machine embodying a shaft, a plurality of spaced cutters on the shaft, a work support movable longitudinally with reference to the shaft, a table on the support movable crosswise of the same, an upward extension on the table rigid therewith having an opening in a direction transverse to the main shaft, a plug in said opening, a screw fixed to the plug and slidable therewith, and a lower chuck jaw held in place on said extension by said screw, substantially as set forth.

4. A key milling machine embodying a shaft, a plurality of spaced cutters on the shaft, a work support movable longitudinally with reference to the shaft, a table movable on the support, an upward extension on the table having a horizontal opening in a direction transverse to the main shaft and a groove on its upper face parallel to said opening, a lower chuck jaw having a tongue on its under side extending into said groove and having a vertically threaded opening, a screw in said opening extending into and fixed to said plug, an upper chuck jaw, and a screw surrounding the first-named screw extending through the upper chuck jaw and having threaded engagement with the lower chuck jaw, substantially as set forth.

5. In a key milling machine, a chuck having upper and lower jaws providing a horizontal groove at one side thereof, a screw to force the lower jaw into a seat on the worktable and a second screw concentric with the first-named screw adapted to force the upper jaw toward the lower jaw, substantially as set forth.

6. A key milling machine comprising a shaft having a series of spaced differentiated cutters, a second shaft parallel to said first mentioned shaft supporting a series of similarly spaced guiding discs for cooperation with said cutters a work support movable longitudinally and transversely of the cutter shaft, and means on the work support for holding a key blank, substantially as set forth.

7. A key milling machine comprising a shaft having a series of spaced differentiated cutters, a second shaft parallel to said first mentioned shaft supporting a series of independently adjustable rotary guiding discs opposite said cutters, adapted for cooperation therewith, a work support movable longitudinally and transversely of the cutter shaft, and means on the work support for holding a key blank, substantially as set forth.

8. A key milling machine comprising a shaft having a series of spaced differentiated cutters, a second shaft parallel to said first mentioned shaft supporting a series of independently laterally and axially adjustable rotary guiding discs opposite said cutters adapted for cooperation therewith, a work support movable longitudinally and transversely of the cutter shaft and means on the work support for holding a key blank, substantially as set forth.

9. In a key milling machine a shaft having a cutter thereon, a guide for cooperation with said cutter, an arm supporting said guide, pivotal supporting means for said arm, means at one end of said arm for moving said guide away from said cutter, and means for forcing said guide toward said cutter, substantially as set forth.

10. In a key milling machine having a work table, a chuck having upper and lower jaws, screw means for forcing the lower jaw into a seat on the work table and additional screw means concentric with the first-mentioned screw means for forcing the upper jaw toward the lower jaw, substantially as set forth.

11. In a key milling machine having a work table, a chuck having coacting jaws providing a work retaining recess at one side thereof, screw means for forcing one of said jaws into a seat on the work table and additional screw means concentric with the first-mentioned screw means and coacting with said last mentioned jaw for forcing the said jaws together, substantially as set forth.

12. In a key milling machine having a work table, an extension on said work table, a chuck jaw longitudinally adjustable on said extension, a second chuck jaw carried by said first mentioned chuck jaw and means for drawing the jaws into gripping relation, substantially as set forth.

13. In a key milling machine, spaced extensions, chucks carried by said extensions having upper and lower jaws and a horizontal groove at one side thereof, means for clamping each of the lower jaws of the chucks in adjusted position on its extension and means concentric with the first-named means for forcing the upper jaw toward the lower jaw, substantially as set forth.

14. A key milling machine comprising a shaft having spaced differentiated cutters, a second shaft supporting similarly positioned independently adjustable guides, a work support movable longitudinally and transversely of the cutter shaft, spaced chucks carried by said work support, one of said chucks being adapted for cooperation with one of said guides while a second chuck cooperates with a cutter for operating upon the work, substantially as set forth.

15. A key milling machine comprising a shaft having spaced differentiated cutters, a second shaft supporting similarly positioned independently adjustable guides, a work support movable longitudinally and transversely of the cutter shaft, spaced chucks carried by said work support, one of said chucks being adapted for cooperation with one of said guides while a second chuck cooperates with a cutter for operating upon the work, said chucks being adjustable toward their cooperating mechanisms.

16. A key milling machine comprising a shaft having spaced differentiated cutters, a second shaft supporting similarly positioned independently adjustable guides, a work support movable longitudinally and transversely of the cutter shaft, spaced chucks carried by said work support, one of said chucks being adapted for cooperation with one of said guides while a second chuck cooperates with a cutter for operating upon the work, said chucks being adjustable toward their cooperating mechanisms, and a bracket carried by the chuck pivotally supporting a transparent guard extending over the key blank, substantially as set forth.

17. A key milling machine comprising a shaft, spaced differentiated cutters on said shaft, sleeves interposed between the cutters and spacing them apart, variable speed mechanism for driving said shaft, a work support movable longitudinally of the shaft, a chuck on the work support movable transversely of the shaft, means whereby the chuck may be moved toward the shaft and yieldable means for moving it away from the shaft, substantially as set forth.

18. A key milling machine comprising a shaft having spaced differentiated cutters, a support on which are positioned independently adjustable guides, a work support movable longitudinally and transversely of the cutter shaft, spaced chucks carried by the work support, one of said chucks being adapted for cooperation with one of said guides while a second chuck cooperates with a cutter for operating upon the work, substantially as set forth.

In witness whereof, I have hereunto set my hand at Indianapolis, Indiana, this 15th day of May, A. D. nineteen hundred and twenty-three.

HERBERT A. DAUM.